Sept. 19, 1944. R. G. LAFITE 2,358,648
RELAY
Filed Oct. 15, 1942
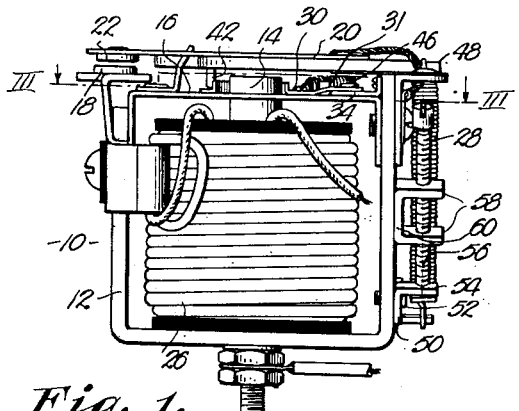
Fig. 1.
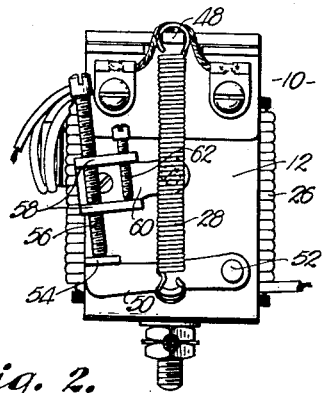
Fig. 2.
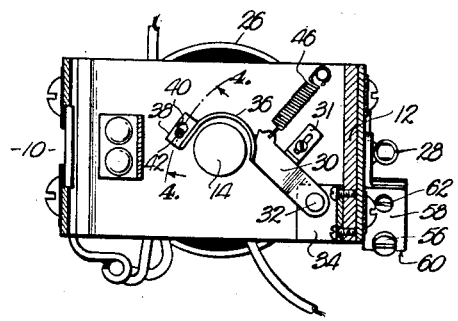
Fig. 3.
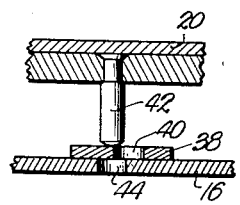
Fig. 4.
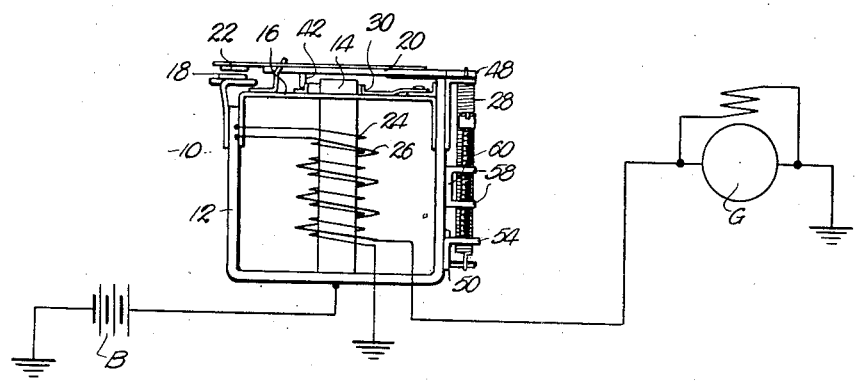
Fig. 5.
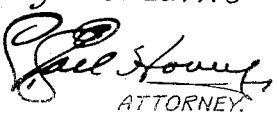
INVENTOR.
Roger G. Lafite
BY
ATTORNEY.

Patented Sept. 19, 1944

2,358,648

UNITED STATES PATENT OFFICE 2,358,648

RELAY

Roger G. Lafite, Kansas City, Mo.

Application October 15, 1942, Serial No. 462,131

1 Claim. (Cl. 200—103)

This invention relates to circuit making and breaking apparatus in the form of a relay, and one of the important aims of the invention is to provide novel parts in such apparatus that will preclude closing of its contact points by an outside force when the relay is not energized.

Many vehicles such as airplanes, tractors, trucks, military tanks and other mobile equipment, have power plants for generating current needed to operate electrical units carried thereby. This generator often becomes a motor and a reverse current relay is a part of the apparatus which likewise, in many instances, includes a battery, conductors, switches, and electrically operated devices.

Accidental closing of contact points forming a part of relays on such vehicles, has therefore caused much difficulty and it is the object of the instant invention to provide means for preventing this accidental closing if an outside force is applied.

In addition to the foregoing important object, this invention has for a further aim the provision of a positive lock for the armature of a relay, which lock is arranged to release when a voltage less than that required to move the contact points together is impressed on the winding of the relay.

A still further object of this invention is to provide a relay of the aforementioned character with means for utilizing the normally detrimental forces tending to accidentally close the contact points thereof, to increase the yieldable resistance provided for normally holding the contact points apart, which means has an appropriate adjustment for conditioning the relay assembly where the same cannot be accidentally shifted by an outside force when the relay is not energized.

A still further object of the invention is to provide simple, durable and inexpensive means for accomplishing the desired aforesaid objects and for conditioning conventional relays so the same may be installed in roughly used equipment without danger of having the contact points thereof accidentally closed.

Other aims of this invention will become apparent during the course of the following specification, reference being had to the accompanying drawing, wherein:

Fig. 1 is a side elevational view of a relay constructed in accordance with the present invention.

Fig. 2 is an end elevation of the relay.

Fig. 3 is a horizontal section taken on line III—III of Fig. 1.

Fig. 4 is an enlarged fragmentary sectional view taken on line IV—IV of Fig. 3; and Fig. 5 is a diagrammatic view showing the relay associated with other parts of an electrical system.

For purposes of illustration, a relay, broadly designated by the numeral 10, is shown to be of substantially conventional construction except for attachments comprising the instant invention. This relay includes the usual yoke 12; a core 14 anchored to the yoke; a bridge 16 of non-magnetic material; a fixed contact point 18, mounted on the yoke; a movable armature 20, carrying a contact point 22; and coils 24 and 26 wound on the core.

Under ordinary conditions, contact points 18 and 22 are held in open, spaced relation to each other by a spring 28. As pointed out above, however, it frequently happens that sudden jolts or jars due to an outside force, are imparted to the relay causing a momentary closing of these points. Current will flow through the coils and magnetize the core to attract the armature. Such action will often damage various parts of the equipment in ways obvious to those skilled in this art.

In order to eliminate any possibility of the points closing under impact imposed upon the relay, intercepting mechanism is contemplated, one form of which includes a magnetic shunt 30 in the nature of an arm having its one end pivoted, as indicated at 32, to a plate 34 connecting the arm to yoke 12. The opposite end of the arm comprises an arcuate portion 36 surrounding a part of core 14 and having a laterally extending lip 38 provided with an opening 40. A depending pin 42 carried by armature 20 is in the arcuate path of travel of lip 38 and in vertical alignment with an aperture 44 provided in bridge 16.

Arm 30 is normally spaced from core 14 by a spring 46 having its opposite ends respectively anchored to the arm 30 and to bridge 16. When in this position (Fig. 3), opening 40 in lip 38 is out of register with depending pin 42 and aperture 44 and armature 20 cannot be moved downwardly to cause contact points 18 and 22 to close. Stop 31 limits the movement of arm 30 from core 14. As soon as core 14 becomes magnetized, however, arm 30 is drawn toward the core thereby bringing opening 40 into vertical alignment with pin 42 and aperture 44 and allowing the movement of armature 20 to close the contact points.

The strength or adjustment of spring 46 is such as to permit the yoke 36 to operate when the coils of the relay 10 are energized to an amount less than that required to attract the armature 20. Thus, the lock or intercepting means will be ineffective when the coils are energized sufficiently to draw together contact points 18 and 22.

To further prevent untimely closing of the contact points 18 and 22, a novel mechanism has been provided for anchoring spring 28. One end of this spring is attached to an ear 48 of armature 20 in the customary manner, but at its opposite end the spring is attached to an intermediate point between the ends of a lever 50. One end of lever 50 is pivoted as at 52 to yoke 12. The opposite end of the lever is provided with a laterally directed abutment 54 adapted to be engaged by an adjusting screw 56 threaded through tapped openings in legs 58 of a yoke 60, secured to yoke 12. A locking screw 62 threaded through one leg of yoke 60 and bearing against the other leg of said yoke, spreads the legs to bind and maintain the adjustment of screw 56. Thus, it will be apparent that any sudden force tending to close contact points 18 and 22 will also swing lever 50 about its pivot in an anti-clockwise direction, as viewed in Fig. 2, thereby increasing the tension of spring 28 and tending to prevent the armature from moving to close points 18 and 22.

The reverse current relay, diagrammatically illustrated in Fig. 5, is equipped with mechanism above described and embodying this invention. It is further illustrated as forming a part of apparatus including a battery B and a motor generator G, all properly grounded and joined by suitable conductors. The likelihood of points 18 and 22 accidentally approaching each other because of shock imparted to relay 10 is overcome by the above described features built into the relay.

From the foregoing specification, it is clear that the invention may be embodied in devices having physically different characteristics than those illustrated and described. It is also clear that the electro-magnetic means is to be operated by the difference in magnetic potential between one side of the magnetic circuit at one end of the coils, and any part that is magnetically connected to the other end thereof.

If the magnetic lock should be released for any reason, the special manner of causing spring 46 to tension upon application of shock due to outside force will insure against accidental or premature closing of points 18 and 22.

The size of abutment 54 on lever 50 may be increased to cause said lever to swing about its pivotal connection 52 when sudden shocks of relatively light intensity are applied from external forces.

Having thus described the invention, what is claimed as new and desired to be secured by Letters Patent is:

In a device of the character described having a yoke and a fixed contact point carried thereby; a movable armature having a contact point, said armature having a depending pin; a magnetic shunt movable in a plane transversely to the movement of said armature, said shunt comprising a body portion pivoted to said yoke and having a thin band-like semi-circular extension thereon positioned close to and concentric with said core, the free end of the extension being provided with a relatively thin lip member extending at a right angle thereto, an opening formed in said lip member and being normally out of registry with said pin, said shunt being movable to permit the opening to register with the pin upon energization of the coil and in response to magnetic attraction of the core on said band-like extension, the armature thereafter being attracted by said core, the armature being responsive to a greater magnetic attraction than that required to move said shunt.

ROGER G. LAFITE.